(12) United States Patent
Vardicos

(10) Patent No.: US 12,154,419 B2
(45) Date of Patent: Nov. 26, 2024

(54) VIDEO RECORDING DEVICE

(71) Applicant: Jeremy Vardicos, Riverdale, MD (US)

(72) Inventor: Jeremy Vardicos, Riverdale, MD (US)

( * ) Notice: Subject to any disclaimer, the term of this patent is extended or adjusted under 35 U.S.C. 154(b) by 127 days.

(21) Appl. No.: 17/947,409

(22) Filed: Sep. 19, 2022

(65) Prior Publication Data

US 2024/0096190 A1     Mar. 21, 2024

(51) Int. Cl.
| | |
|---|---|
| *G08B 21/04* | (2006.01) |
| *H04N 1/21* | (2006.01) |
| *H04N 23/51* | (2023.01) |
| *H04N 23/62* | (2023.01) |
| *H04N 23/65* | (2023.01) |

(52) U.S. Cl.
CPC ..... *G08B 21/0446* (2013.01); *G08B 21/0476* (2013.01); *H04N 1/2129* (2013.01); *H04N 23/51* (2023.01); *H04N 23/62* (2023.01); *H04N 23/65* (2023.01)

(58) Field of Classification Search
CPC .. H04N 1/2129; H04N 1/2112; H04N 1/2131; H04N 1/2141; H04N 1/2145; H04N 23/50; H04N 23/51; H04N 23/60; H04N 23/62; H04N 23/65; H04N 23/667; G08B 21/0446; G08B 21/0476
See application file for complete search history.

(56) References Cited

U.S. PATENT DOCUMENTS

| | | | |
|---|---|---|---|
| 2003/0025798 A1* | 2/2003 | Grosvenor | G06V 40/193 348/207.99 |
| 2016/0314674 A1* | 10/2016 | He | G06F 1/163 |
| 2017/0323663 A1* | 11/2017 | Boykin | G08B 13/19613 |
| 2018/0357887 A1* | 12/2018 | Geyer | G08B 21/0469 |
| 2019/0230258 A1* | 7/2019 | Phillips | H04N 7/188 |
| 2019/0244637 A1* | 8/2019 | Smith | G06Q 50/18 |
| 2021/0217286 A1* | 7/2021 | Peyrard | G08B 21/0492 |
| 2022/0217308 A1* | 7/2022 | Mont-Reynaud | H04N 23/611 |
| 2022/0256074 A1* | 8/2022 | Guo | H04N 23/60 |
| 2022/0321763 A1* | 10/2022 | Burton | G03B 29/00 |

FOREIGN PATENT DOCUMENTS

CN     114668388 A  *  6/2022

\* cited by examiner

*Primary Examiner* — Andrew W Bee
(74) *Attorney, Agent, or Firm* — The Iwashko Law Firm, PLLC; Lev Ivan Gabriel Iwashko

(57) ABSTRACT

A video recording device to be worn by a user, the video recording device including a main body, a camera disposed on at least a portion of main body to record at least one of at least one picture and at least one video thereon, a control unit disposed within at least a portion of the main body to direct the camera to record the at least one video for a predetermined duration in response to a real time mode being activated and save the at least one video for the predetermined duration in response to receiving a save command, and an ear connector disposed on at least a portion of the main body to removably connect the main body to an ear of the user.

5 Claims, 1 Drawing Sheet

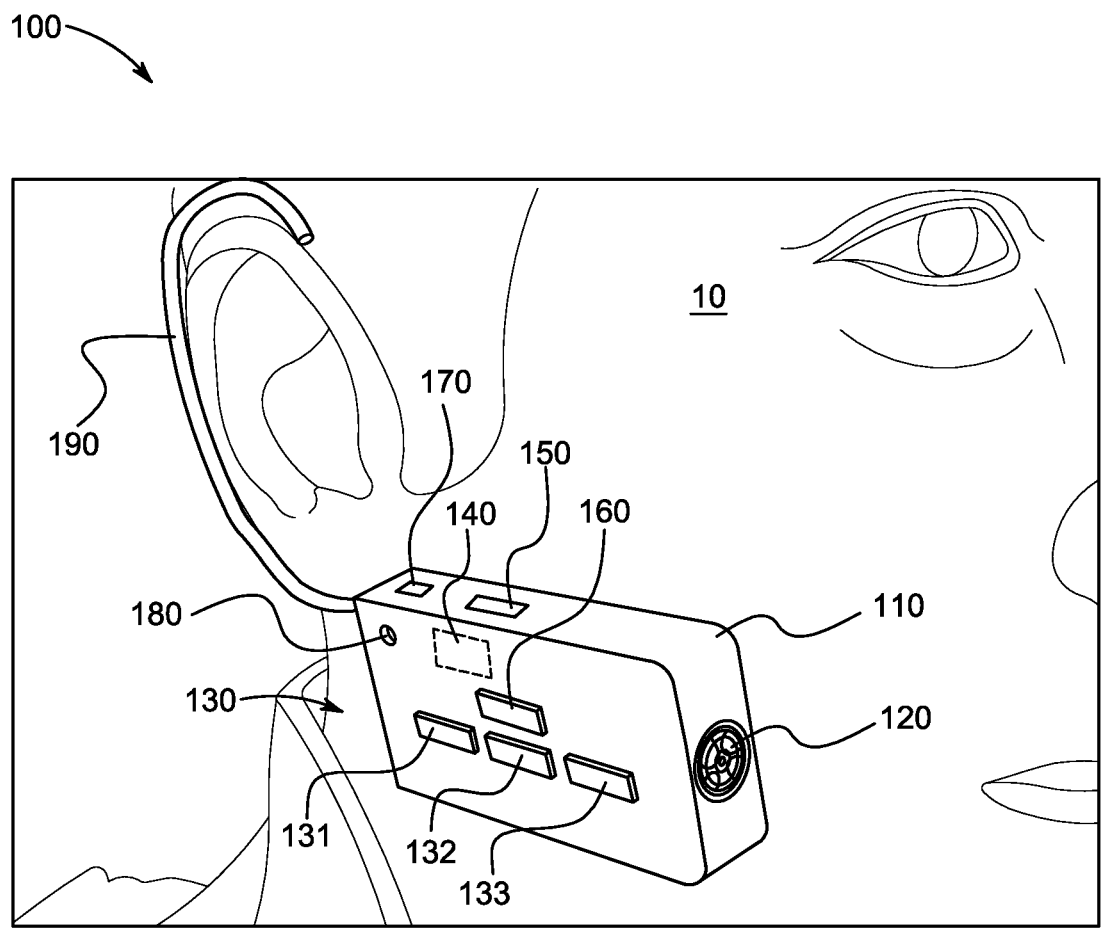

VIDEO RECORDING DEVICE

BACKGROUND

1. Field

The present general inventive concept relates generally to video, and particularly, to a video recording device.

2. Description of the Related Art

At any given moment, an event transpires that a person wishes they caught the event on camera. The person will want to capture the event during either a joyous situation and/or an unfortunate disaster where evidence is required to better describe the event that occurred.

Most video cameras require support on a tripod stand and/or being handheld by the person. Moreover, a typical video camera begins recording when a record button is depressed. However, it is often unknown when an important event will occur. Thus, the person using the video camera will have to be lucky to record the event that is intended to be recorded.

Therefore, there is a need for a video recording device that records footage constantly and only saves the footage when desired by the user.

SUMMARY

The present general inventive concept provides a video recording device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a video recording device to be worn by a user, the video recording device including a main body, a camera disposed on at least a portion of main body to record at least one of at least one picture and at least one video thereon, a control unit disposed within at least a portion of the main body to direct the camera to record the at least one video for a predetermined duration in response to a real time mode being activated and save the at least one video for the predetermined duration in response to receiving a save command, and an ear connector disposed on at least a portion of the main body to removably connect the main body to an ear of the user.

The control unit may cache the at least one video received from the camera up to the predetermined duration.

The control unit may automatically delete any portion of the at least one video exceeding the predetermined duration.

The video recording device may further include a control panel, including a first button disposed on at least a portion of the main body to turn on the camera in response to being depressed a first time, and turn off the camera in response to being depressed a second time, a second button disposed on at least a portion of the main body to begin recording of the at least one video on the camera in response to being depressed a first time, and stop recording in response to depressing the second button a second time, and a third button disposed on at least a portion of the main body to turn on the real time mode in response to being depressed a first time, and turn off the real time mode in response to being depressed a second time.

The control unit may include a vibration sensor configured to detect movement corresponding to at least one of a crash and a fall by the user and automatically save the at least one video on the control unit.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a side perspective view of a video recording device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Video Recording Device 100
Main Body 110
Camera 120
Control Panel 130
First Button 131
Second Button 132
Third Button 133
Control Unit 140
Storage Receiving Slot 150
Storage Indicator 160
Power Source 170
Power Indicator 180
Ear Connector 190

FIG. 1 illustrates a side perspective view of a video recording device 100, according to an exemplary embodiment of the present general inventive concept.

The video recording device 100 may be constructed from at least one of metal, plastic, wood, glass, and rubber, etc., but is not limited thereto.

The video recording device 100 may include a main body 110, a camera 120, a control panel 130, a control unit 140, a storage receiving slot 150, a storage indicator 160, a power source 170, a power indicator 180, and an ear connector 190, but is not limited thereto.

Referring to FIG. 1, the main body 110 is illustrated to have a rectangular prism shape. However, the main body 110 may be rectangular, circular, cylindrical, triangular, pentagonal, hexagonal, heptagonal, octagonal, or any other shape known to one of ordinary skill in the art, but is not limited thereto.

The main body 110 may have a size (e.g., length, width, height) and/or weight that is portable on a head of a user. In other words, the main body 110 may be comfortable to be worn on the head of the user.

The camera 120 may include any type of camera known to one of ordinary skill in the art, including, but not limited to, an action camera, an animation camera, an autofocus camera, a box camera, a camcorder, a camera phone, a compact camera, a dashboard camera (i.e., a Dashcam), a digital camera, a field camera, a FIREWIRE camera, a helmet camera, a high-speed camera, an instant camera, a keychain camera, a live-preview digital camera, a movie camera, an omnidirectional camera, a pinhole camera, a pocket camera, a pocket video camera, a rangefinder camera, a reflex camera, a remote camera, a stereo camera, a still camera, a still video camera, a subminiature camera, a system camera, a thermal imaging camera, a thermographic camera, a traffic camera, a traffic enforcement camera, a twin-lens reflex camera, a video camera, a view camera, a webcam, a WRIGHT camera, a ZENITH camera, a zoom-lens reflex camera.

The camera 120 may be disposed on at least a portion of main body 110, such that the camera 160 may be flush with the main body 110. The camera 120 may record at least one picture and/or at least one video thereon.

The control panel 130 may include a first button 131, a second button 132, and a third button 133, but is not limited thereto.

The first button 131 may be disposed on at least a portion of the main body 110. The first button 131 may turn on the camera 120 in response to being depressed a first time. Conversely, the first button 131 may turn off the camera 120 in response to being depressed a second time.

The second button 132 may be disposed on at least a portion of the main body 110. The second button 132 may be used to begin recording of the at least one video on the camera 120 in response to being depressed a first time. Subsequently, the camera 120 may stop recording in response to depressing the second button 132 a second time.

The third button 133 may be disposed on at least a portion of the main body 110. The third button 133 may turn on (i.e., activate) a real time mode in response to being depressed a first time. Subsequently, the third button 133 may turn off the real time mode in response to being depressed a second time. Also, the second button 132 may stop the real time mode and end recording in response to being depressed while the real time mode is on.

The control unit 140 may include a processing unit, a communication unit, and a storage unit, but is not limited thereto.

The control unit 140 may be disposed within at least a portion of the main body 110.

The processing unit (or central processing unit, CPU) of the control unit 140 may include electronic circuitry to carry out instructions of a computer program by performing basic arithmetic, logical, control and input/output (I/O) operations specified by the instructions. The processing unit of the control unit 140 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit of the control unit 140 may also include a microprocessor and a microcontroller.

The communication unit of the control unit 140 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit of the control unit 140 may include a random access memory (RAM), a read-only memory (ROM), a hard disk, a flash drive, a database connected to the Internet, cloud-based storage, Internet-based storage, or any other type of storage unit.

The processing unit of the control unit 140 may access the Internet via the communication unit of the control unit 140 to allow the user to access a website, and/or may allow a mobile application and/or the software application to be executed using the processing unit of the control unit 140. For ease of description, the mobile and/or the software application will be hereinafter referred to as an app. The app may be downloaded from the Internet to be stored on the storage unit of the control unit 140. Also, the processing unit, the communication unit, and/or the storage unit may be mechanically and/or electrically connected to the camera 120 and/or the control panel 130, such that the processing unit of the control unit 140 via the app may control operations of the camera 120 using the control panel 130.

The processing unit of the control unit 140 executing the app may direct the camera 120 to record the at least one picture and/or the at least one video The processing unit of the control unit 140 may receive a signal (e.g., a save command) from the second button 132 to save the recording from the camera 120 to the storage unit of the control unit 140 while the camera 120 is already recording.

Furthermore, the processing unit of the control unit 140 executing the app may direct the camera 120 to record the at least one picture and/or the at least one video for a predetermined duration (e.g., one minute, three minutes, five minutes, etc.) in response to turning on the real time mode using the third button 133. In other words, the camera 120 may send the at least one video to be cached (i.e., temporarily stored) on the storage unit of the control unit 140 for the predetermined duration until any portion of the at least one video exceeding the predetermined duration is automatically deleted. However, turning of the real time mode using the third button 133 may automatically save the at least one video with the predetermined duration. As such, the real time mode may be used to continuously record events that have transpired.

Also, the processing unit of the control unit 140 may be connected to a vibration sensor within the control unit 140 to automatically save a tragic event on the storage unit that has been recorded by the camera 120. For example, the vibration sensor of the control unit 140 may be configured to detect movement corresponding to a crash and/or fall by the user that is also confirmed to be a crash and/or fall by the processing unit, such that the recording by the camera 120 may be saved on the storage unit.

The storage unit of the control unit 140 may delete the at least one picture and/or the at least one video in response to depressing the second button 132 and the third button 133 simultaneously.

The storage receiving slot 150 may include a card reader and a disk reader, but is not limited thereto.

The storage receiving slot 150 may be disposed on at least a portion of the main body 110. The storage receiving slot 150 may receive an external storage card, such as a memory card, a flash memory card, a flash memory disk, and/or any other type of memory medium. The storage receiving slot 150 may be used to receive the external storage card instead of using the storage unit of the control unit 140 and/or to transfer data from the storage unit to the external storage card. Alternatively, the data on the storage unit of the control unit 140 may be accessed through the communication unit of the control unit 140 using an external device (e.g., a mobile device, a cell phone, a laptop computer, a desktop computer, a tablet computer, etc.). It is important to note that the data on the storage unit may include the at least one picture and/or the at least one video recorded by the camera 120 and/or any other data related to operation of the camera 120 and/or the control unit 140.

The storage indicator 160 may include a light, but is not limited thereto.

The storage indicator 160 may be disposed on at least a portion of the main body 110. The storage indicator 160 may illuminate a first color (i.e., white) and/or remain steady in response to the storage unit of the control unit 140 and/or the external storage card being empty and/or less than full. Moreover, the storage indicator 160 may illuminate a second color (i.e., red) and/or flash in response to the storage unit of the control unit 140 and/or the external storage card being full.

The power source 170 may include a battery, a charging port, and a solar cell, but is not limited thereto.

The power source 170 may be disposed on and/or within at least a portion of the main body 110. The power source 170 may provide power to the camera 120, the control panel 130, the control unit 140, the storage receiving slot 150, the storage indicator 160, and/or the power indicator 180. Also, the power source 170 may connect to an external power source (e.g., a power outlet) using a cord to receive power to charge the battery.

The power indicator 180 may be disposed on at least a portion of the main body 110. The power indicator 180 may illuminate a first color (i.e., green) and/or remain steady in response to the power source 170 having at least fifty percent charge. Additionally, the power indicator 180 may illuminate a second color (i.e., yellow) and/or flash in response to the power source 180 having less than fifty percent charge.

The ear connector 190 may include a hook, a clip, a snap, a clamp, and a clasp, but is not limited thereto.

The ear connector 190 may be disposed on at least a portion of the main body 110. The ear connector 190 may removably connect the main body 110 to at least a portion of a body of the user, such as an ear of the user. As such, the main body 110 may be suspended from the ear of the user allowing the camera 120 to record without support from hands of the user.

Therefore, the video recording device 100 may record video footage constantly without intervention by the user, which may include unexpected events. Also, the video recording device 100 may save the at least one video as desired by the user.

The present general inventive concept may include a video recording device 100 to be worn by a user, the video recording device 100 including a main body 110, a camera 120 disposed on at least a portion of main body 110 to record at least one of at least one picture and at least one video thereon, a control unit 140 disposed within at least a portion of the main body 110 to direct the camera 120 to record the at least one video for a predetermined duration in response to a real time mode being activated and save the at least one video for the predetermined duration in response to receiving a save command, and an ear connector 190 disposed on at least a portion of the main body 110 to removably connect the main body 110 to an ear of the user.

The control unit 140 may cache the at least one video received from the camera 120 up to the predetermined duration.

The control unit 140 may automatically delete any portion of the at least one video exceeding the predetermined duration.

The video recording device 100 may further include a control panel 130, including a first button 131 disposed on at least a portion of the main body 110 to turn on the camera 120 in response to being depressed a first time, and turn off the camera 120 in response to being depressed a second time, a second button 132 disposed on at least a portion of the main body 110 to begin recording of the at least one video on the camera 120 in response to being depressed a first time, and stop recording in response to depressing the second button a second time, and a third button 133 disposed on at least a portion of the main body 110 to turn on the real time mode in response to being depressed a first time, and turn off the real time mode in response to being depressed a second time.

The control unit 140 may include a vibration sensor configured to detect movement corresponding to at least one of a crash and a fall by the user and automatically save the at least one video on the control unit 140.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A video recording device to be worn by a user, the video recording device comprising: a main body; a camera disposed on at least a portion of main body to record at least one of at least one picture and at least one video thereon; a control unit disposed within at least a portion of the main body to direct the camera to record the at least one video for a predetermined duration in response to a real time mode being activated and save the at least one video for the predetermined duration in response to receiving a save command; and an ear connector disposed on at least a portion of the main body to removably connect the main body to an ear of the user, such that the ear connector wraps around the ear of the user from a bottom portion of the ear of the user to a back portion of the ear of the user to a top portion of the ear of the user and the main body hangs below the ear of the user.

2. The video recording device of claim 1, wherein the control unit caches the at least one video received from the camera up to the predetermined duration.

3. The video recording device of claim 1, wherein the control unit automatically deletes any portion of the at least one video exceeding the predetermined duration.

4. The video recording device of claim 1, further comprising:
a control panel, comprising:
a first button disposed on at least a portion of the main body to turn on the camera in response to being depressed a first time, and turn off the camera in response to being depressed a second time,
a second button disposed on at least a portion of the main body to begin recording of the at least one video on the camera in response to being depressed a first time, and stop recording in response to depressing the second button a second time, and
a third button disposed on at least a portion of the main body to turn on the real time mode in response to being depressed a first time, and turn off the real time mode in response to being depressed a second time.

5. The video recording device of claim 1, wherein the control unit comprises:
a vibration sensor configured to detect movement corresponding to at least one of a crash and a fall by the user and automatically save the at least one video on the control unit.

\* \* \* \* \*